Aug. 30, 1966 G. V. WOODLING 3,269,420
TURBULATOR FOR FLUID CONDUIT
Filed Aug. 13, 1963 3 Sheets-Sheet 1
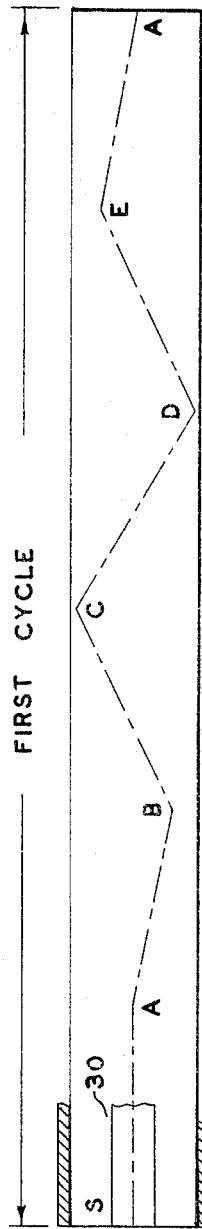
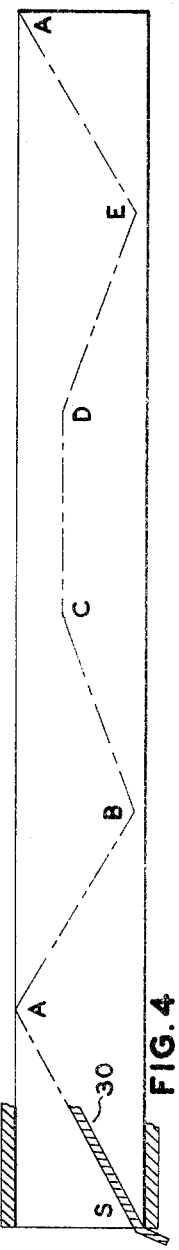
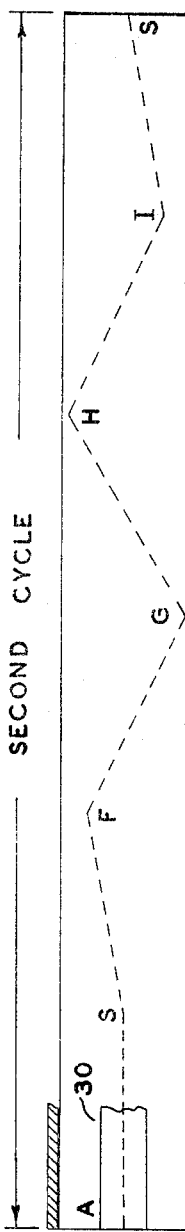
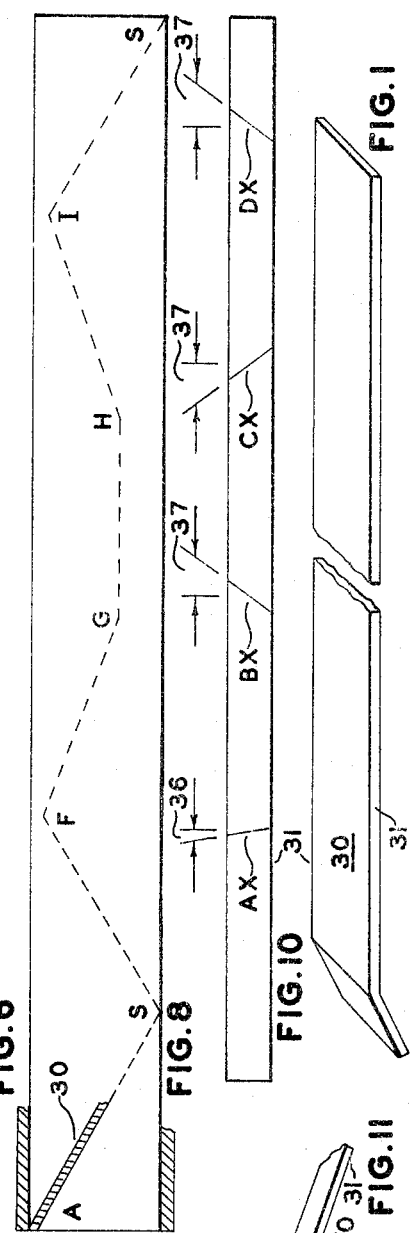
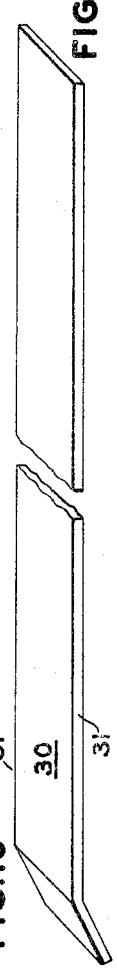
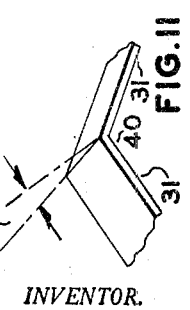
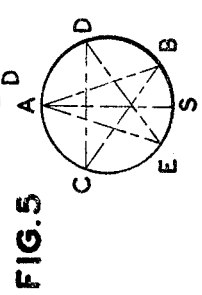
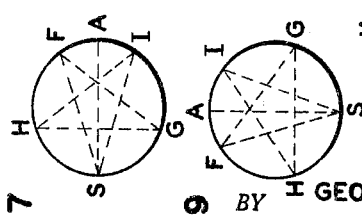
INVENTOR.
GEORGE V. WOODLING
BY Woodling, Krost, Granger and Rust attys.

Aug. 30, 1966   G. V. WOODLING   3,269,420
TURBULATOR FOR FLUID CONDUIT
Filed Aug. 13, 1963   3 Sheets-Sheet 2

INVENTOR.

BY GEORGE V. WOODLING

Aug. 30, 1966    G. V. WOODLING    3,269,420
TURBULATOR FOR FLUID CONDUIT
Filed Aug. 13, 1963    3 Sheets-Sheet 3
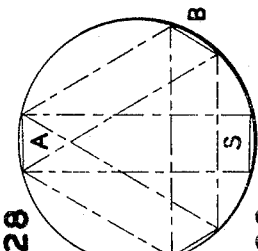
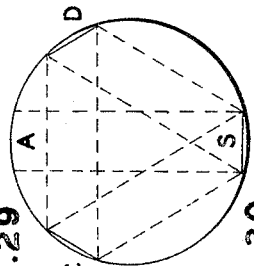
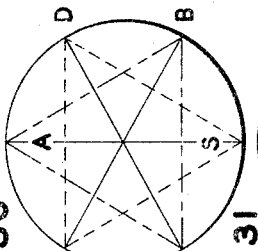
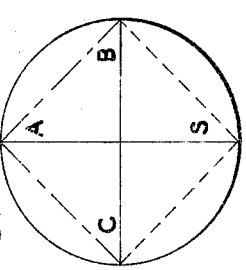
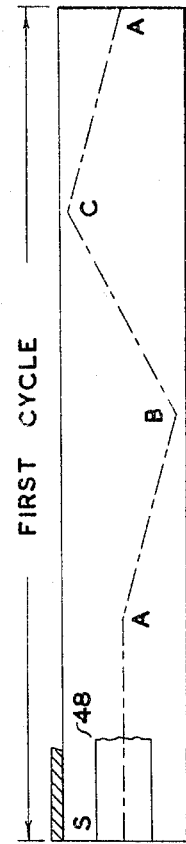
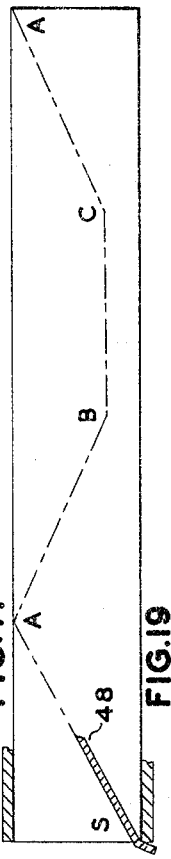
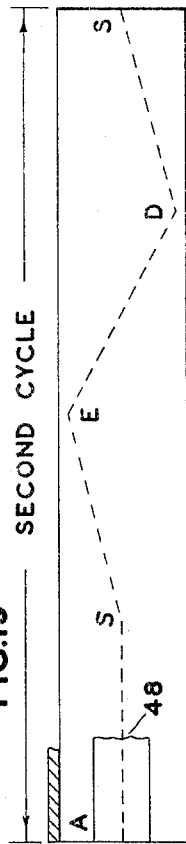
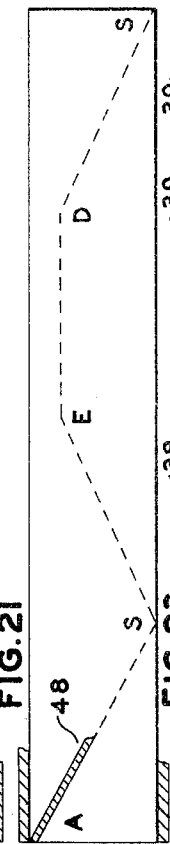
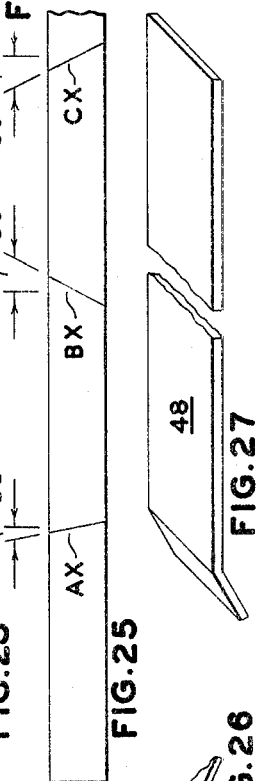
INVENTOR.
BY GEORGE V. WOODLING United States Patent Office
3,269,420
Patented August 30, 1966

3,269,420
TURBULATOR FOR FLUID CONDUIT
George V. Woodling, 22077 W. Lake Road,
Rocky River 16, Ohio
Filed Aug. 13, 1963, Ser. No. 301,815
8 Claims. (Cl. 138—38)

My invention relates to a fluid turbulator for elongated fluid conduits or tubes.

The inner wall of the fluid conduit is generally cylindrical and the fluid may be either gas or liquid. My turbulator may be used in heat transfer tubes to increase the efficiency of the heat transfer or in hydraulic tubes to absorb sudden fluid shocks.

An object of my invention is to provide a plurality of generally zig-zag deflecting faces against which the fluid flows for directing the fluid radially outwardly towards the inner wall of the conduit and away from the central core where the fluid would normally tend to flow.

Another object is the provision of a turbulator which may be easily inserted into and easily removed from the inside of a tubular conduit.

Another object is the provision of a turbulator having a plurality of generally zig-zag deflecting faces, some of said faces extending across the diameter of the conduit and other of said faces extending across a chord of the conduit.

Other objects and a fuller understanding of my invention may be had by referring to the following description and claims, taken in conjunction with the accompanying drawings, in which:

FIGURE 1 is a perspective view of a strip of metal from which my turbulator may be bent or constructed;

FIGURE 2 is a diagrammatic view of a conduit in which my turbulator may be removably inserted, the conduit being shown partially in horizontal section and being a top view of the conduit showing the first cycle portion of my turbulator;

FIGURE 3 is a diagrammatic end view looking down the inside of the conduit of FIGURE 2, the deflecting faces of the turbulator which extend across the conduit as chords forming a five-pointed star as viewed from the end of the conduit.

FIGURE 4 is a diagrammatic view similar to FIGURE 2, partially in vertical section, and being a side view of the conduit shown in FIGURE 2;

FIGURE 5 is a diagrammatic view similar to FIGURE 3 and is an end view of FIGURE 4;

FIGURE 6 is a diagrammatic continuation of FIGURE 2 and shows a second cycle of the turbulator;

FIGURE 7 is a diagrammatic end view of FIGURE 6.

FIGURE 8 is a diagrammatic view similar to FIGURE 6 partially in vertical section, and being a side view of the conduit shown in FIGURE 6;

FIGURE 9 is a diagrammatic end view of FIGURE 8;

FIGURE 10 is a plan view of a strip from which my turbulator may be bent and shows the transverse angles at which the bends occur;

FIGURE 11 is a fragmentary view showing a bent corner portion of my turbulator;

Figure 12:
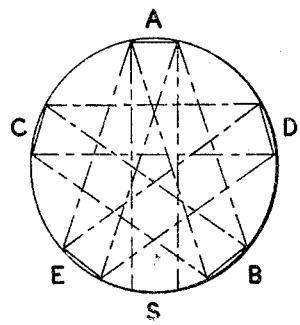
FIGURE 12 is a diagrammatic view similar to FIGURE 5 but shows the end view of the turbulator as it would appear if removed from the tube and the faces all compressed substantially one against the other, and showing the true length of the faces in the plane of the drawing paper.
Figure 13:
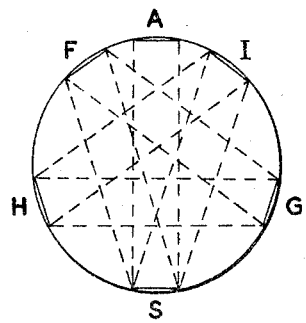
FIGURE 13 is a diagrammatic view similar to FIGURE 9 but showing the end view of the turbulator as it would appear if removed from the tube and the faces all compressed substantially one against the other, showing the true length of the faces in the plane of the drawing paper.

FIGURES 17 to 26, inclusive, are respectively the same as FIGURES 2 to 11, inclusive, except that the faces of the turbulator as viewed from the end of the tube define a triangle;

FIGURE 27 shows a perspective view of a strip of metal from which my tubulator may be bent, the strip being similar to the strip in FIGURE 1 but of a generally broader width;

FIGURES 28 and 29 are similar to FIGURES 12 and 13 except that the compressed chord faces of the turbulator as viewed from the end of the tube diagrammatically defines a triangle instead of a star;

FIGURE 30 diagrammatically depicts a double-triangle within a circle and is a combination of the compressed faces in FIGURES 28 and 29, the lines in FIGURE 30 representing center-lines of the compressed faces in FIGURES 28 and 29 which are superimposed one upon the other; and FIGURE 31 is a diagrammatic view similar to FIGURE 30 except that the faces of the turbulator as viewed from the end define a square.

With reference to FIGURES 1 to 11, inclusive, my turbulator comprises a strip of metal 30 having longitudinal side edges 31. The left-hand end of the strip has a portion 32 which is slightly bent downwardly, serving as a handle to insert and withdraw the turbulator from the inside of the tube. The strip of metal may preferably comprise hot rolled strip steel and for a boiler tube having a 3-inch internal diameter, the width of the strip may preferably vary from ¾-inch to one inch. The tube having a 3-inch internal diameter the width of the thickness of the strip may be in the neighborhood of $\frac{1}{16}$-inch. The strip may also be round for hydraulic tubing.

The turbulator comprises a plurality of generally zig-zag deflecting faces and may be easily inserted into and withdrawn from the fluid conduit represented generally by the reference character 33. The fluid conduit may be any number of different devices, namely: fire tubes in boilers or other fuel burning devices, radiator tubes, heat exchangers for oil coolers, tubes for hot water heaters, and tubes for hydraulic systems. In some instances, such for example, as fire tubes for boilers, the tubes may be at least five to eight feet in length. For long strips, the turbulator may comprise a series of cycles which repeat themselves several times, depending upon the length of the turbulator. FIGURE 2 shows the deflecting faces for the first cycle which comprises faces S–A, A–B, B–C, C–D, D–E and E–A, where A is a repeat point for the beginning of the second cycle as shown in FIGURE 4. The deflecting face S–A extends across the diameter of the inner wall of the tube and the faces A–B, B–C, C–D, D–E and E–A extend across chords of the inner wall of the tube. The deflecting faces for the second cycle, as shown in FIGURES 6 and 8, are A–S, S–F, F–G, G–H, H–I and I–S, where S is the repeat point for the beginning of another cycle which is a duplication of the first cycle, after which there would be another repeated cycle similar to the second cycle, the cycles continuing in such fashion to the end of the turbulator. The deflecting face A–S extends across the diameter of the inner wall of the tube and the faces S–F, F–G, G–H, H–I and I–S extend across chords of the inner wall of the tube.

The faces which extend across the diameter of a tube may be referred to as diameter-faces and the faces which extend across the chords of the tube may be referred to as chord-faces. The faces where they meet form a corner portion as shown in FIGURE 11. The angle X represents an angle that a transverse axis of the bend makes with respect to a perpendicular to the sides of the strip. An end view of the corner portions formed by the chord-faces depict a five-pointed star within a circle. These corner portions make a slight friction contact with the inner wall of the conduits and are disposed longitudinally apart from each other and are positioned annularly around the inner wall of the conduit.

The turbulator strip, as shown in FIGURE 10, is marked off with transverse axes indicating the angle at which the strip is to be bent. At point A of the strip, the transverse axis is identified by the reference character AX. The angle 36 at the transverse axis AX for a five-pointed star is approximately 9 degrees. The angle 37 for the remaining transverse axes at BX, etc. is approximately 18 degrees. The reason that the angle at the transverse axis AX is one-half that of the remaining transverse axes of the cycle resides in the fact that the deflecting face S–A extends across the diameter of the circular tube, whereas the remaining deflecting faces of the cycle extend across chords of the circular tube. Thus, the angle of the bend between a diameter and a chord is one-half of the angle of the bend between a chord and an adjacent chord.

As previously explained, the turbulator strip where it is bent at a transverse axis forms a corner portion, such as shown in FIGURE 11. The joined faces at the respective corner portions have side edges 31 which define an obtuse included angle 40 therebetween. In practice, the included angle may lie in a range from 90 to 150 degrees. The size of the angle is preferably greater than 90 degrees so that the fluid when it strikes the deflecting faces does not meet too much resistance to its flow.

In operation, the fluid as it flows through the conduit is deflected radially outwardly toward the inner wall of the conduit and away from the central core where the fluid would normally tend to flow. In the case of a heat transfer tube, this greatly increases the efficiency of the transfer of heat and in the case of a hydraulic tube, the action of the fluid against the deflecting faces absorbs sudden fluids shocks. When the hydraulic fluid flows gently through the tube, the resistance to the flow of the fluid caused by the turbulator is not sufficient to affect the normal operation of the hydraulic system, but in the case of a sudden fluid shock, the resistance of impedance to the flow of the fluid caused by the turbulator is greatly magnified because of the sudden increase in speed of the fluid. The action of the turbulator is such that it does not normally affect the operation of the hydraulic system but does become immediately effective to absorb sudden fluid shocks.

FIGURE 12 is a view similar to FIGURE 5 but shows the end view of the turbulator as it would appear if removed from the tube and the faces all compressed substantially one against the other, showing the true length of the faces. FIGURE 13 is a view similar to FIGURE 9 but shows the end view of the turbulator as it would appear if removed from the tube and the faces all compressed substantially against the other, showing the true length of the faces. The circles in FIGURES 12 and 13 do not represent the inner circumference of the tube, but are enlarged circles defined by the corner portions, representing the true length of the compressed faces in the plane of the drawing paper. In these FIGURES 12 and 13, the diameter-faces and the chord-faces will blank the center core of the conduit, and as a result the fluid which would normally tend to flow through the center core of the conduit is deflected radially outwardly towards the inner wall of the conduit. It is to be observed that the star in FIGURE 13, being an end view of the second cycle, is a reciprocal of that shown in FIGURE 12, being an end view of the first cycle. Therefore, as the fluid flows from one end of the conduit to the other, it experiences the combined deflecting action of the first and second cycles.

Figure 14:
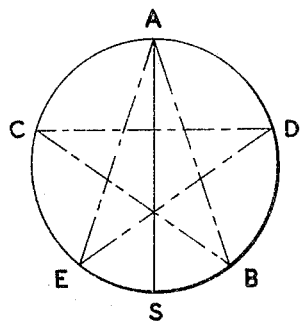
FIGURE 14 shows diagrammatically the center-line of the compressed faces in FIGURE 12, the center-line passing through the diameter being shown as a full line and the center-lines passing through the chords being shown as dash-dot lines.
Figure 15:
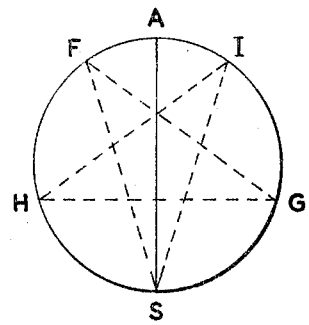
FIGURE 15 shows diagrammatically the center-line of the compressed faces in FIGURE 13, the center-line passing through the diameter being shown as a full line and the center-lines passing through the chords being shown as dotted lines.

The FIGURES 14 and 15 show the center-line of the compressed faces in FIGURES 12 and 13, respectively. The center-line which passes through the diameter faces is shown as a full line and the center lines which pass through the chord-faces are shown as dash-dot and dotted lines, respectively. The purpose of showing the FIGURES 14 and 15 is to explain the foundation for the construction of the turbulator represented by the FIGURE 16 which illustrates the position of the center-line of compressed faces, as if FIGURE 15 were superimposed on FIGURE 14.

Figure 16:
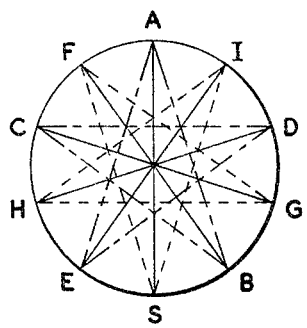
FIGURE 16 is a diagrammatic combination of FIGURES 14 and 15, being the same as if FIGURE 15 were superimposed on top of FIGURE 14, the figure depicting a double star within a circle.

In FIGURE 16, the first and second cycles are combined in one and the turbulator beginning at S in FIGURE 16 has deflecting faces in the following order: S–A, A–B, B–F, F–G, G–C, C–D, D–H, H–I, I–E, E–A and A–S. In the turbulator constructed in accordance with FIGURE 16, the angle at the transverse axes is substantially 9 degrees at all of the corners. The reason of this is that the bends are always made between a diameter-face and a chord-face. The arrangement in FIGURE 16 makes a very efficient turbulator because the center core portion where the fluid normally tends to flow is well blanked by the deflecting faces, yet along the inner wall of the tube there remain many spaces for the fluid to flow freely therethrough. In FIGURE 16 the diameter-faces constitute a first plurality of deflecting faces which extend in a first plurality of paths across the circle. The chord-faces in FIGURE 16 constitute a second plurality of faces which extend in a second plurality of paths across the circle. These paths form at least ten corner portions defining generally a double-star within a circle. The ten corner portions, when the turbulator is extended to its normal length, lie on a circle, having a diameter the same as the circles in FIGURES 3, 5, 7 and 9 to fit inside of the conduit. The twelve corners are disposed longitudinally apart from each other and positioned annularly around the inner wall of the conduit.

The FIGURES 17 to 26, inclusive, are respectively the same as the FIGURES 2 to 11, inclusive, except that the faces of the turbulator as viewed from the end of the tube define a triangle instead of a star. The description with respect to the FIGURES 2–11 apply equally well to the FIGURES 17–26, except that the triangle has three corner portions within a circle instead of the five corner portions within a circle as depicted by the star. The angle 38 at the transverse axis AX in FIGURE 25 is approximately 15 degrees instead of 9 degrees for the star. The angle 39 at the transverse axis BX, etc. is substantially 30 degrees instead of 18 degrees for the star. For the triangle, the width of the metal strip 48 may be broader than it is for the star because of the generally wide open space within the triangle. Such a wider strip is shown in FIGURE 27. The width of the strip may be in a range from one-sixth to one-half the diameter of the conduit.

The FIGURES 28 and 29 depict a triangle turbulator, being similar to FIGURES 12 and 13, and show the end view of the turbulator as it would appear if removed from the tube and the faces compressed one against the other and showing the true length of the faces. Here, again, the circles in FIGURES 28 and 29 do not represent the inner circumference of the tube, but are enlarged circles defined by the corner portions, showing the true length of the compressed faces in the plane of the drawing paper. The triangle in FIGURE 29, being an end view of the second cycle, is a reciprocal of that shown in FIGURE 28, being an end view of the first cycle.

The FIGURE 30 depicts a double triangle within a circle and is a combination of the compressed faces in FIGURES 28 and 29, the lines in FIGURE 30 representing center-lines of the compressed faces in FIGURES 28 and 29, which are superimposed one upon the other. In FIGURE 30, the first and second cycles are combined in one, having diameter-faces S–A and C–D and chord-faces A–B, B–C, C–A, S–E, E–D and D–S. When the turbulator in FIGURE 30 is extended to its normal length, the six corner portions lie on a circle having a diameter the same as the circles in FIGURES 18, 20, 22 and 24 to fit the conduit.

The FIGURE 31 depicts a square within a circle. The square has diameter-faces S–A and C–B, and chord-faces A–B, A–C, S–B and S–C. The angle at the transverse axes in FIGURE 31 between a diameter-face and a chord-face is approximately 22½ degrees and between one chord-face and another chord-face is approximately 45 degrees.

When the turbulator of FIGURE 31 is extended to its normal length, the four corner portions lie on a circle having a diameter the same as the circles in FIGURES 18, 20, 22 and 24 to fit in the conduit.

In my invention, the corner portions, when viewed from the end of the conduit, may depict configurations other than triangles, squares, and stars, and may include many configurations having a larger number of sides than those shown herein. There is, however, a practical limit to the number of sides of such a configuration, because the more the number of sides to a configuration, the closer the chord-faces hug the inner wall of the conduit in which case the effectiveness of the turbulator is proportionately decreased. An exception to this rule is the case of the star configuration, because in a star configuration there is an advantage arising from the fact that the chord-faces are almost as long as the diameter-faces and thus do not hug the inner wall of the conduit as closely as the triangle and square configurations. Then, too, in a star configuration, the angles of the transverse axes are smaller than they are in the triangle and square configurations. The fact that the diameter-faces and the chord-faces in a star configuration are almost the same length, makes a star configuration very effective in directing the fluid which would normally tend to flow in the central core radially toward the inner wall of the conduit to improve the heat transfer in the case of a heat transfer tube and to absorb the fluid shocks in the case of a hydraulic system.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:
1. A turbulator for an elongated fluid conduit having substantially a cylindrical inner wall, said turbulator being insertable generally longitudinally within said conduit and comprising a strip of metal including a plurality of generally zig-zag deflecting means against which the fluid flows, said means having end portions joined together to form a corner portion between the respective joined means, the joined means at the respective corner portions having side edges defining an obtuse included angle therebetween, the joined means at the respective corner portions meeting to define a transverse axis disposed at an oblique angle with respect to a perpendicular to the side edges of the strip, said strip having a plurality of corner portions including at least three corner portions defining generally a circle viewed from the end of the conduit, said corner portions disposed longitudinally apart from each other and positioned annularly around the inner wall of the conduit.

2. The structure of claim 1, wherein at least one of said deflecting means extends generally across the diameter of the inner wall of the conduit and wherein at least another of said deflecting means extends generally across a chord of the inner wall of the conduit.

3. The structure of claim 1, wherein said plurality of deflecting means includes at least a plurality of said means extending generally across a chord of the inner wall of the conduit.

4. The structure of claim 1, wherein said plurality of deflecting means includes at least three of said means extending generally across a chord of the inner wall of the conduit and defining generally a triangle within a circle viewed from the end of the conduit.

5. The structure of claim 1, wherein said plurality of deflecting means includes at least four of said means extending generally across a chord of the inner wall of the conduit and defining generally a square within a circle viewed from the end of the conduit.

6. The structure of claim 1, wherein said plurality of deflecting means includes at least five of said means extending generally across a chord of the inner wall of the conduit and defining generally a star within a circle viewed from the end of the conduit.

7. The structure of claim 1, wherein said plurality of corner portions includes at least a plurality of consecutive corner portions with the transverse axes respectively thereat being disposed at an angle with respect to each other.

8. The structure of claim 1, wherein said plurality of corner portions includes at least two consecutive corner portions with the transverse axes respectively thereat being disposed at an angle with respect to each other.

No references cited.

LAVERNE D. GEIGER, *Primary Examiner.*

T. MOORHEAD, *Assistant Examiner.*